United States Patent
Hood et al.

(10) Patent No.: US 7,609,471 B2
(45) Date of Patent: Oct. 27, 2009

(54) TAPE CARTRIDGE AUXILIARY MEMORY CONTAINING TAPE DRIVE FUNCTIONAL STATUS INFORMATION

(75) Inventors: Randall Curtis Hood, Thornton, CO (US); Michael Gerard Goberis, Broomfield, CO (US); Alexander Dillard Segars, III, Boulder, CO (US)

(73) Assignee: Spectra Logic Corporation, Denver, CO (US)

( * ) Notice: Subject to any disclaimer, the term of this patent is extended or adjusted under 35 U.S.C. 154(b) by 0 days.

(21) Appl. No.: 11/925,224

(22) Filed: Oct. 26, 2007

(65) Prior Publication Data

US 2009/0109571 A1 Apr. 30, 2009

(51) Int. Cl.
*G11B 19/02* (2006.01)
(52) U.S. Cl. ....................................................... 360/69
(58) Field of Classification Search ........................ None
See application file for complete search history.

(56) References Cited

U.S. PATENT DOCUMENTS

| | | | |
|---|---|---|---|
| 6,425,042 B1 | 7/2002 | Ikeda et al. | |
| 6,817,563 B2* | 11/2004 | Iino | 242/348 |
| 2003/0090829 A1* | 5/2003 | Johnson et al. | 360/69 |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0052772 A1* | 3/2005 | Barbian et al. | 360/69 |
| 2006/0077585 A1* | 4/2006 | Larson | 360/69 |
| 2006/0164928 A1 | 7/2006 | Starr et al. | |
| 2007/0008641 A1* | 1/2007 | Tada et al. | 360/69 |
| 2007/0195447 A1 | 8/2007 | Starr et al. | |
| 2008/0002273 A1* | 1/2008 | Fujiwara | 360/69 |
| 2008/0037160 A1* | 2/2008 | McIntosh et al. | 360/88 |

OTHER PUBLICATIONS

U.S. Appl. No. 11/412,565, filed Apr. 27, 2006, Starr et al.
The seventh edition of the *IBM Total Storage LTO Ultrium Tape Drive SCSI Reference* (Jun. 2007).
The first edition of the *IBM Setup, Operation, and Service Guide to IBM TotalStorage 3580 Tape Drive Model L33/L3H, Reference* (Dec. 2004).

* cited by examiner

Primary Examiner—Andrew L Sniezek

(57) ABSTRACT

A data storage library is described including a plurality of tape cartridges each possessing an auxiliary radio frequency memory device. The library also includes, at least one tape drive capable of determining at least one functional status when loaded with one of the tape cartridges wherein the at least one tape drive possesses an auxiliary reader and writer device capable of transferring information associated with the at least one function status to and from the auxiliary radio frequency memory device. The tape drive is further capable of transmitting the information from the auxiliary radio frequency memory device to a display device that can be viewed by an end user.

13 Claims, 13 Drawing Sheets

| Bar code SN | Loads | | | | | | | | Action |
|---|---|---|---|---|---|---|---|---|---|
| AAC | 0 | 0 | 0 | 7 | 7 | 7 | 7 | 7 | Alert |
| AAF | 0 | 0 | 0 | 0 | 4 | 5 | 4 | 4 | Alert |
| BCC | 0 | 0 | 6 | 6 | 6 | 6 | 6 | 6 | Alert |

FIG. 6A

| Bar code SN | Loads | | | | | | | | Action |
|---|---|---|---|---|---|---|---|---|---|
| AAA | 0 | 0 | 0 | 0 | 6 | 0 | 0 | 6 | None |
| AAB | 0 | 0 | 0 | 0 | 0 | 0 | 0 | 0 | None |
| AAC | 0 | 0 | 0 | 7 | 7 | 7 | 7 | 7 | Alert |
| . | | | | | | | | | |
| . | | | | | | | | | |

| Serial No. AAA Load Count | Drive 1 | Drive 2 | Drive 3 | Drive 4 |
|---|---|---|---|---|
| 1 | | 0 | | |
| 2 | | | 6 | |
| 3 | 0 | | | |
| 4 | | | | 0 |
| 5 | | | 6 | |
| 6 | 0 | | | |
| 7 | | 0 | | |
| 8 | | | 6 | |

TAPE CARTRIDGE AUXILIARY MEMORY CONTAINING TAPE DRIVE FUNCTIONAL STATUS INFORMATION

CROSS-REFERENCE TO RELATED APPLICATIONS

None.

BACKGROUND OF THE INVENTION

1. Field of the Invention

The present invention relates generally to tape libraries using auxiliary memory devices contained in tape storage cartridges to record functional status information related to tape drives.

2. Description of Related Art

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of obtaining cursory information about a specific tape cartridge without requiring a time-consuming media load and tape threading process to read the on-tape index file, techniques using holes arranged in patterns in the cartridge casing and later electrical pads grounded in a variety of combinations were introduced. The holes and/or electrical pads provided simple information such as tape capacity, manufacturer, etc. Today, these techniques are yielding to the introduction of Radio Frequency chips disposed in the tape cartridges called a Memory-In-Cartridge (MIC) or Medium Auxiliary Memory (MAM), because of increased amounts of information and ease of use. FIG. 1A shows an example of a tape cartridge 100, tape medium 102, and MIC 104, shown here in dashed lines because the MIC 104 and tape medium 102 reside in the interior of the cartridge 100. In this example, the MIC is disposed in an LTO-3 cartridge which can be provided by TDK Corp. of Tustin, Calif.

A MIC allows the tape drive to access valuable cartridge data without the use of a physical connection, reducing connector wear for both the drive and the media. The MIC is a memory chip built into the data cartridge that provides a direct and immediate connection to the drive's on-board processors, which speeds access to information related to the data cartridge such as system logs, for example. Information and file search parameters are formatted within the MIC system effectively cutting the data access time down to a fraction from historical techniques.

As shown in FIG. 1B, a MIC 104 fundamentally comprises an integrated circuit that includes solid state memory and a transponder 124 attached to an antenna 126, the antenna is typically a small coil of wires. The MIC 104 is considered a passive device because it is energized when subjected to a strong enough RF field produced by a MIC-Reader. Information can be transmitted between the MIC and the MIC-Reader via a specific radio frequency.

Currently a MIC, or MAM, is parceled into regions for a medium, device and host. The three regions can accommodate attributes related to a medium with a MIC. For example a medium attribute can be a serial number permanently stored in the MAM during manufacturing, a device attribute can be load count maintained by the tape drive and a host attribute can be a backup date maintained by the application client. These attributes are strictly read and written to by a reader disposed in a drive.

In an effort to expand capabilities of a storage element containing a MIC operable with a tape drives functional status when loaded with a cartridge, both methods and apparatus are disclosed herein. It is to innovations related to this subject matter that the claimed invention is generally directed.

SUMMARY OF THE INVENTION

The present invention relates generally to tape libraries using auxiliary memory devices contained in tape cartridges to record functional status information related to tape drives overcoming the disadvantages and limitations of the prior art by making the functional status information available to an end user via the tape cartridge's radio frequency memory device.

One embodiment of the present invention can therefore comprise a tape storage library comprising: a plurality of tape cartridges each possessing an auxiliary radio frequency memory device; at least one tape drive capable of determining at least one functional status when loaded with one of the tape cartridges wherein the at least one tape drive possesses an auxiliary reader and writer device capable of transferring information associated with the at least one function status to and from the auxiliary radio frequency memory device; means for transmitting the information from the auxiliary radio frequency memory device to a display device that can be viewed by an end user.

Other embodiments of the present invention may additionally comprise a tape storage library comprising: a tape cartridge possessing an auxiliary radio frequency memory device; a tape drive capable of displaying a functional status on a single character display when loaded with the tape cartridge, the tape drive possessing an auxiliary reader and writer device capable of transferring information associated with the function status to and from the auxiliary radio frequency memory device wherein the auxiliary radio frequency memory device is capable of storing the information; means for transmitting the information from the auxiliary radio frequency memory device to a display device that can be viewed by an end user.

Yet further embodiments of the present invention may comprise a method comprising steps of: providing a library with a tape drive that possesses a functional status identification means, a tape drive auxiliary memory reader and writer device associated with the tape drive, a designated cumulative auxiliary storage location, and a tape cartridge that possesses an auxiliary memory device; loading the tape cartridge in a cooperating relationship with the tape drive for a first time; storing a first functional status of the tape drive and the tape cartridge to the auxiliary memory device via the tape drive auxiliary memory reader and writer device; reading the first functional status of the first load from the auxiliary memory device via the tape drive auxiliary memory reader and writer device; transmitting the first functional status from the tape drive auxiliary memory reader and writer device to the designated cumulative auxiliary storage location; recording the first functional status in the designated cumulative auxiliary storage location wherein the cumulative auxiliary storage location may contain other functional status information obtained from a plurality of other tape cartridges via the tape drive auxiliary memory reader and writer device; and unloading the tape cartridge from the tape drive.

BRIEF DESCRIPTION OF THE DRAWINGS

FIG. 6A-6C shows various embodiments of a displayed data table pertaining to historical tape drive functional status related information as recorded on a tape cartridges auxiliary radio frequency memory device in accordance with an embodiment of the present invention.

DETAILED DESCRIPTION

Figure 2A:
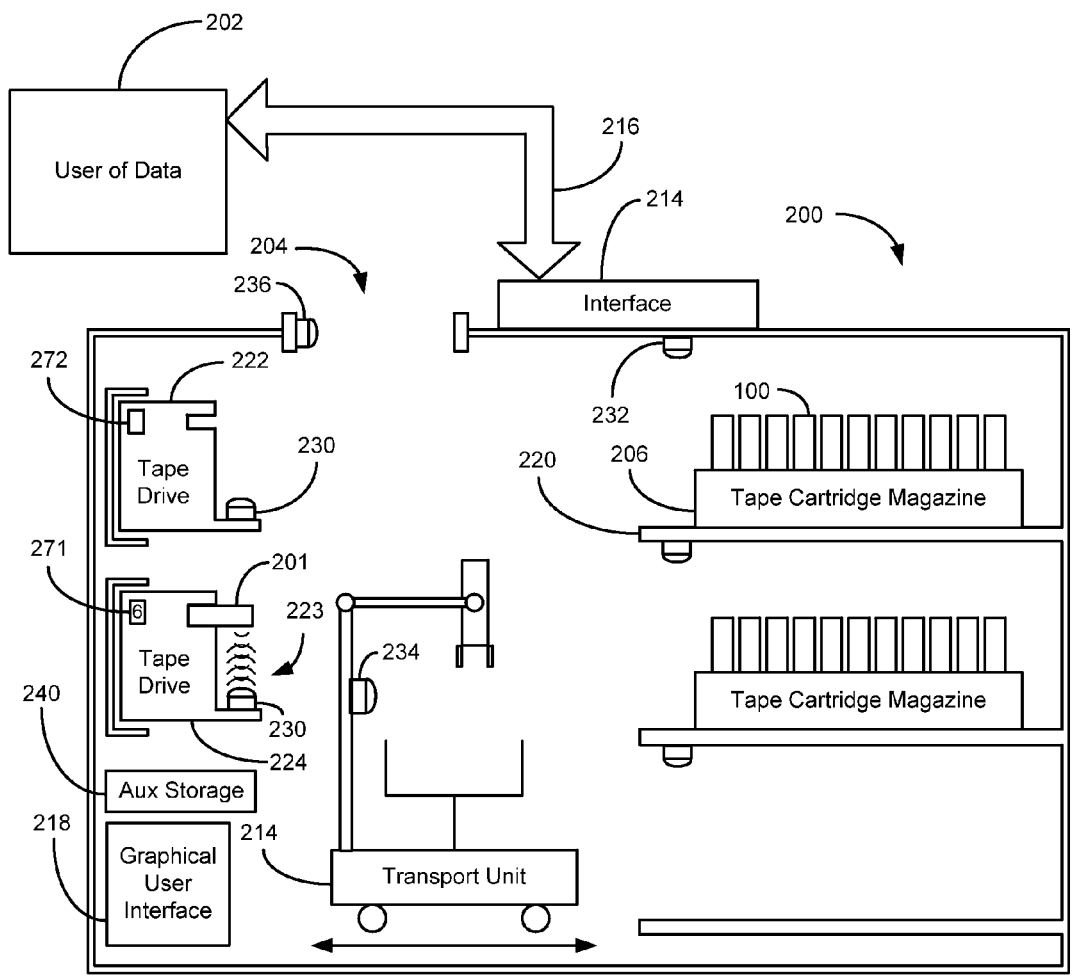
FIG. 2A is an illustration of a tape cartridge arrangement comprising a magnetic recording tape medium loaded with functional status information for a drive with functional status capabilities displayed on a single character display constructed in accordance with an embodiment of the present invention.

Referring to the drawings in general, and more specifically to FIG. 2A, shown therein is an illustration of a data storage arrangement constructed in accordance with an embodiment of the present invention. In what follows, similar or identical structures may be identified using identical callouts.

Figure 1A:
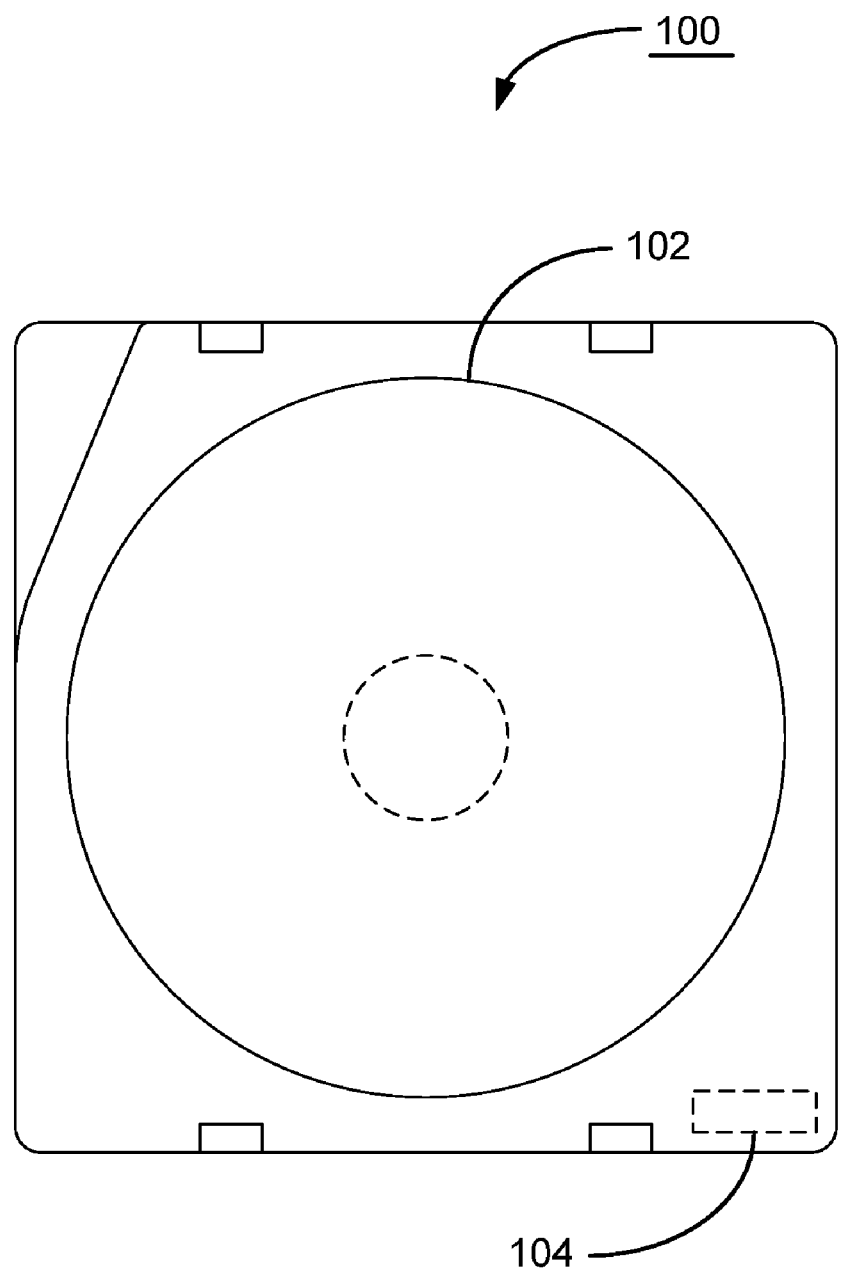
FIG. 1A is a prior art pictorial representation of a tape cartridge with an auxiliary radio frequency memory device.
Figure 1B:
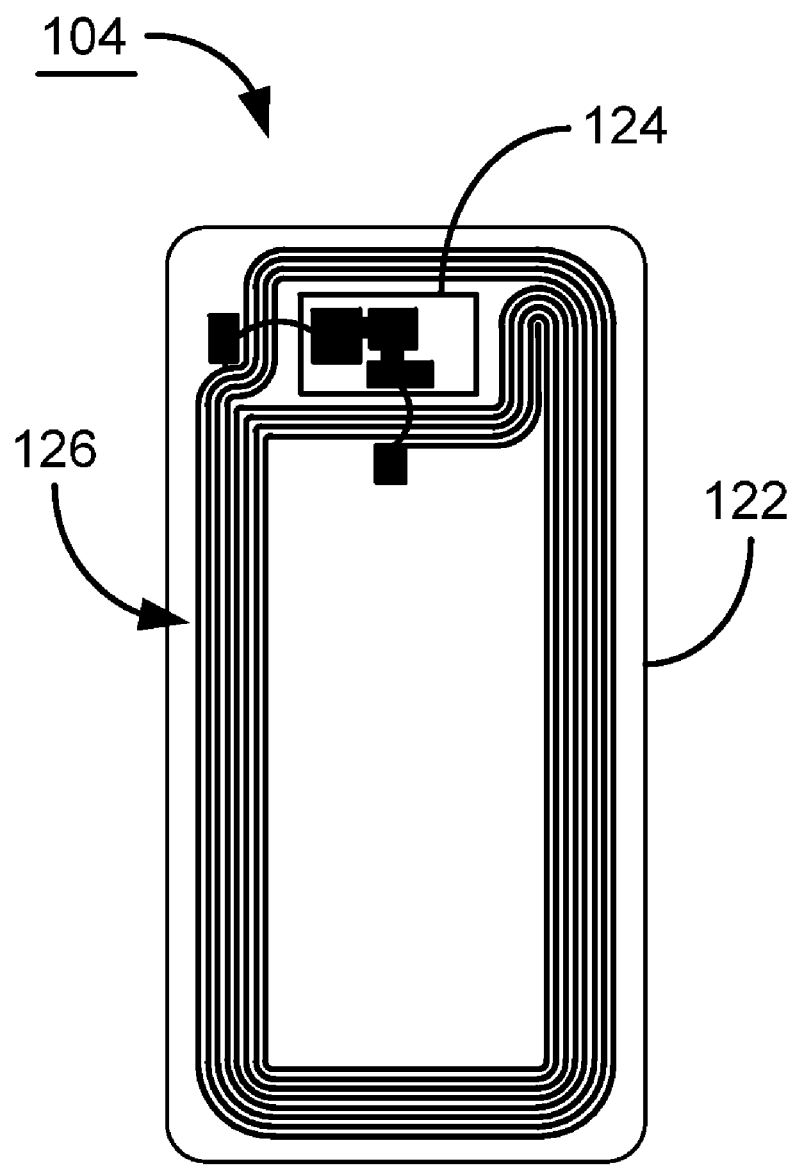
FIG. 1B is a prior art pictorial representation of an auxiliary radio frequency memory device.

The data storage arrangement illustrated in FIG. 2A can comprise a user of data 202, such as a client, in communication 216 with a data storage library 200. As illustratively shown, the client 202 is in communication with the library 200 via the communication path 216 and the library interface device 214. The library 200 comprises a plurality of tape cartridges 100 disposed in a tape cartridge magazine 206 wherein each of the tape cartridges contains an auxiliary radio frequency memory device (not shown), such as the MAM 104 of FIG. 1B, capable of retaining auxiliary digital data. In this embodiment, the library 200 also comprises several tape drives 222 and 224, each capable of reading user data from and writing user data to one each of the plurality of tape cartridges 100. User data herein is considered data from a source such as the user of data 202 that is stored on the tape medium 102, of FIG. 1A. Each tape drive 222 and 224 can be associated with a tape drive radio frequency memory device 230, as shown. Each tape drive 222 and 224 can further comprise a Single Character Display (SCD) 271 and 272 that corresponds to the functional status of the respective drive 224 and 222 when loaded with a tape cartridge 100. An example of a loaded tape drive is the tape cartridge 201 inserted in the tape drive 224 in a cooperating reading and writing relationship where user data can be stored and read from the tape medium 102 contained substantially by the cartridge 201. As shown here, the loaded tape drive 224 is also in radio frequency communication 223 with the auxiliary radio frequency memory device 104 (not shown) associated with tape cartridge 201 via the tape drive radio frequency memory device 230 associated with tape drive 224. As illustratively shown, the SCD 271 associated with the loaded tape drive 224 has displayed a functional status corresponding to the number "6" which may be indicative of a specific error code, for example. Hence, the SCD displays the functional information as a single character representation, such as "0", "3", "5", "6", "B", "Z", etc. For instance, an LTO-3 tape drive, manufactured by IBM from of Armonk, N.Y., comprises an SCD wherein the SCD corresponding to "6" is indicative of a tape drive or media error, which is an error indeterminate of whether the root cause of error is the tape drive or tape cartridge. Other examples of SCD functional status includes no error found, drive cooling problem, power problem with the drive, firmware problem with the library interfacing with the drive, tape drive firmware problem, tape drive hardware problem, media error, combination tape drive and media error, bus failure, and drive needs to be cleaned, just to name a few examples. After determining the functional status of a tape loaded in a drive, the tape drive 224 can transmit the functional status information, such as that shown on the SCD 271, to the auxiliary radio frequency memory device 104 associated with the loaded tape cartridge 201. Optionally, the tape drive 224 can read the historical functional status information corresponding to one or more previous load events that are stored on the auxiliary radio frequency memory device 104 associated with the loaded tape cartridge 201 via the tape drive radio frequency memory device 230. Once read, the historical functional status can be sent to the auxiliary storage device 240, for example. The auxiliary storage location 240 can accommodate information from a plurality of auxiliary radio frequency memory devices 104 in cumulative ways. In another embodiment of the present invention, SCD information from one or more tape cartridges 100 can be manipulated with an algorithm, such as one provided by the library 200, for example, to generate statistical data that can be transmitted to a display device for use by an operator or end user, for example. In another embodiment, the statistics generated can be further retained in the auxiliary storage device 240, or some other location, for example.

Figure 2B:
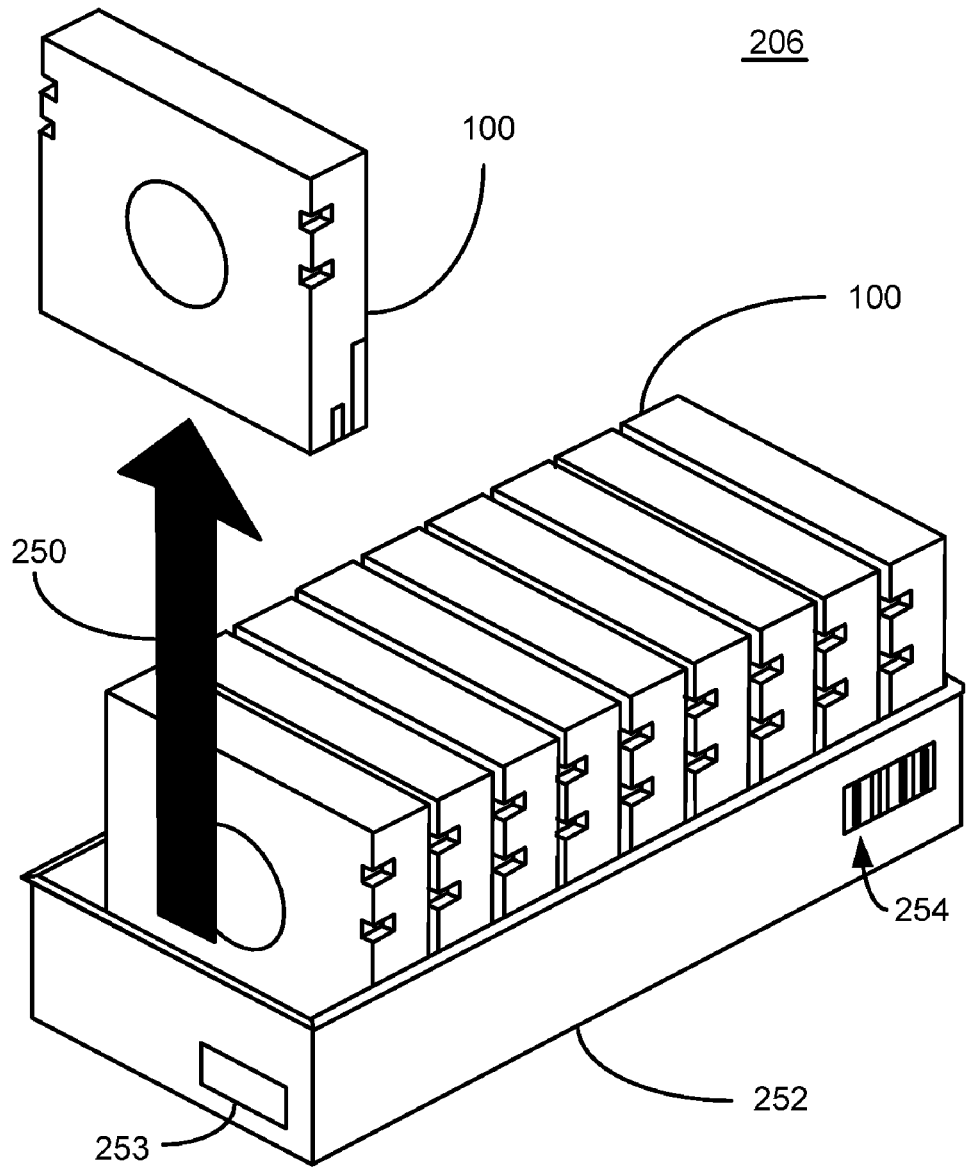
FIG. 2B is an illustration of a populated tape cartridge magazine in accordance with an embodiment of the present invention.

The library 200 can further comprise a shelving system 220 capable of archiving the tape cartridge magazines 206 within the library 200. In this embodiment, the shelving system 220 is associated with one or more auxiliary radio frequency memory device readers 232 that is at least capable of reading data, such as the SCD information, stored on an auxiliary radio frequency memory device 104 contained by each tape cartridge 100. A transport unit 214 comprises means to transport a tape cartridge magazine 206 from the shelf system 220 to a location that facilitates a tape cartridge 100 to be inserted in one of the drives 222 or 224, such as tape cartridge 201 in a cooperating relationship with drive 224 to read and write data as shown. The transport device 214 can optionally be associated with at least one auxiliary radio frequency memory device reader 234, as shown here, disposed on the transport unit 214. The library 200 also optionally comprises an entry/exit port 204 whereby tape cartridges 100 or tape cartridge magazines 206 can be transferred between an environment external to the library 200 and an environment internal to the library 200. As shown here, at least one auxiliary radio frequency memory device reader 236 is associated with the entry/exit port 204. The auxiliary radio frequency memory device readers 232, 234 and 236 are independent of the tape drive radio frequency memory device 230, that is, devices 232, 234 and 236 are disposed in a location not associated with a tape drive. In this embodiment, the library 200 can accommodate a graphical user interface 218 and an auxiliary memory 240, such as a disk drive or solid state memory device, capable of retaining (storing) relevant information related to each tape 100, such as that which is stored on an auxiliary radio frequency memory device 104. In one embodiment, the tape cartridges 100 or the tape cartridge magazines may be associated with different user of data such that the storage space in the library 200 is partitioned into two or more parts wherein each part is associated with the different user of data for example. With reference to FIG. 2B, shown therein are tape cartridges 100 supported by a tape cartridge magazine 206. In more detail, a tape cartridge 100, such as an LTO-3 category tape cartridge manufactured by IBM, comprises magnetic tape that is capable of storing digital data written by a compatible drive 220 or 224, such as an LTO tape drive manufactured by IBM, when in cooperation (i.e. loaded) with the tape cartridge 201 as shown in FIG. 2A. The tape cartridge magazine 206 is shown populated with a plurality of tape cartridges 100. A tape cartridge 100 can be removed from the tape cartridge magazine 206, as shown by the arrow 250, and inserted in to the tape drive 220 or 224 by means of a picker device 502, shown in FIG. 5. Disposed on the tape cartridge magazine 252 is a bar code identifier 254 for identifying the tape cartridge magazine 206 which has utility should the tape cartridge magazine 206 be archived in a media pack storage vault, for example. In this embodiment, all tape cartridges 100 contain an auxiliary radio frequency memory device 104, however, in alternative embodiments, some tape cartridges may not contain an auxiliary radio frequency memory device 104. In another embodiment of the present invention, the magazine 206 can comprise a magazine auxiliary memory device 253 that is capable of containing information from at least one of the data cartridges 100 the magazine 206 supports. The magazine auxiliary memory device 253 can receive information from the auxiliary radio frequency memory devices 104 contained by each tape cartridge 100 via one or more auxiliary radio frequency memory device readers 232, 234 or 236, for example. Information from the auxiliary radio frequency memory devices 104 can be read and immediately transmitted to the magazine auxiliary memory device 253, or alternatively, the information of each auxiliary radio frequency memory devices 104 can be stored on the auxiliary storage device 240 and then transferred to the magazine auxiliary memory device 253, just to name two examples.

An auxiliary radio frequency memory device 104, in one embodiment, is parceled into three regions in which data can be stored; a medium device region which contains information such as a serial number, a device region which contains information from the tape drive such as load count, and host/vendor unique region wherein information such as history and/or performance data related to the cartridge 100 can be stored. The information in the regions can be added to with new information via an address related to the arrangement of available storage space in the auxiliary radio frequency memory device 104 or, optionally, the information can be read by an auxiliary memory reader, such as the reader 230, and reassembled with additional information and stored on the auxiliary radio frequency memory device 104 as the reassembled version, just to name two examples. In another example, if the storage limit is reached in the auxiliary radio frequency memory device 104, such as the host/vendor data in the host/vendor unique region, the host/vendor data can be read and stored in an auxiliary storage space, such as the auxiliary memory 240, and the host/vendor unique region purged and made available for new information. In another example, the host/vendor data can be compressed with algorithms to decompress residing in the library 200 or user of data 202, for example.

Figure 3:
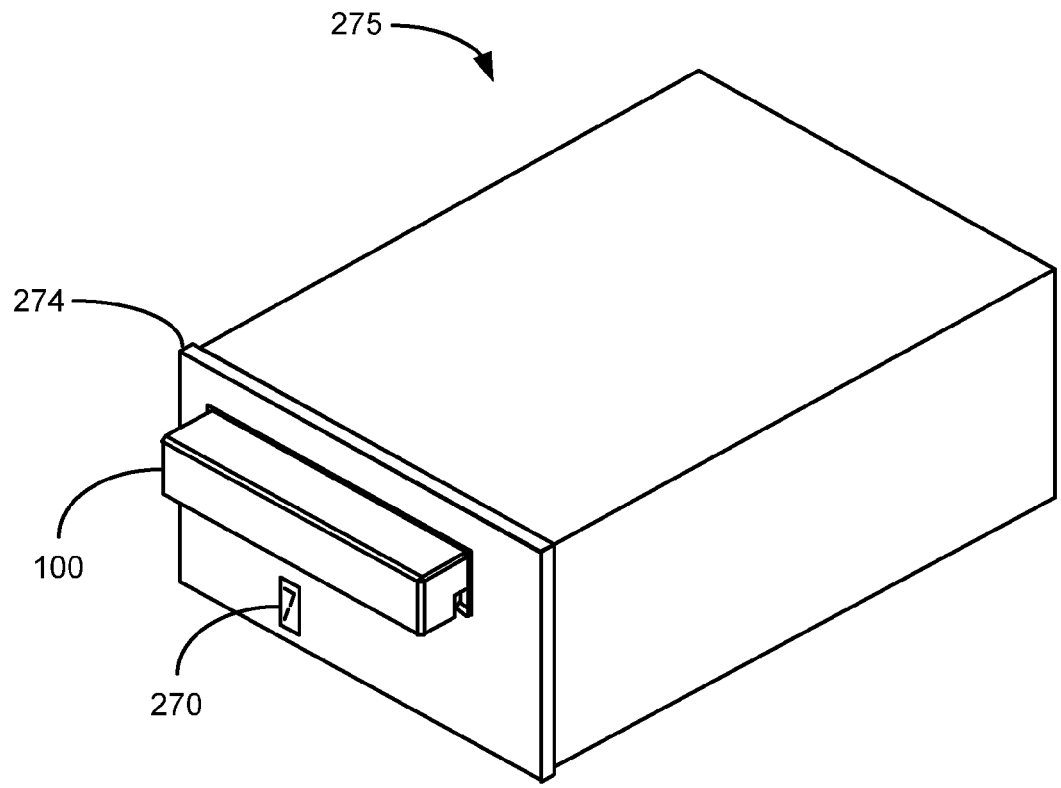
FIG. 3 is an illustration an embodiment of a shelf system that comprises an auxiliary memory reader that can be used in combination with a loaded tape cartridge magazine in accordance with an embodiment of the present invention.

With reference to FIG. 3, shown therein is an illustration of a tape drive 275 according to some embodiments of the present invention. As shown, the tape cartridge 100 is loaded in the tape drive 275 via a receiving opening in the drive face 274 to form a cooperating read and write relationship. The tape drive 275 is capable of identifying drive/cartridge 275 and 100 functional status and displaying the functional status via an SCD 270 featured on the drive face 274. The tape drive 275 further possesses an auxiliary memory reader and writer device (not shown), that transfers information associated with the functional status, i.e., the SCD information, to the auxiliary radio frequency memory device 104 associated with the tape 100 wherein the information is in a form consistent with kind of auxiliary digital data stored in the auxiliary radio frequency memory device 104. The auxiliary memory reader and writer device associated with the tape drive 275 can also read the historical functional status information stored on the tape's auxiliary radio frequency memory device 104. The historical functional status information is the information accrued from previous occasions that tape cartridge 100 was loaded in the (or a different) tape drive 275. The tape drive 275 can then transmit the functional and/or historical functional status information to the graphical user interface 218, the user of data 202, the auxiliary storage device 240, or an alternative location to where an end user can view the data either directly or indirectly.

Figure 4:
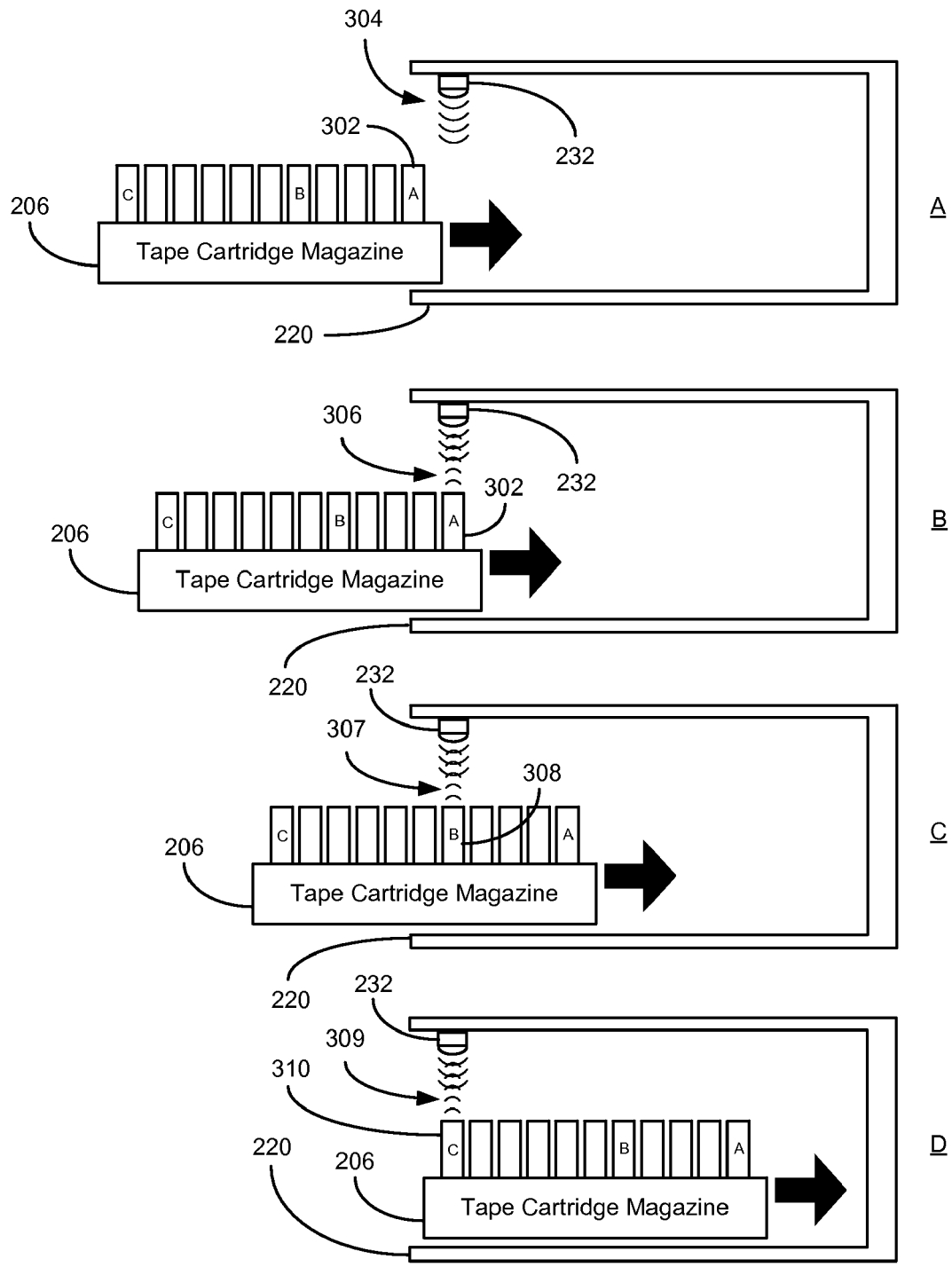
FIG. 4 is an illustration of a transport unit and auxiliary memory reader arrangement in accordance with an embodiment of the present invention.

FIG. 4 illustrates an embodiment of a shelf system 220 that comprises an auxiliary memory reader 232 that can be used in combination with a loaded tape cartridge magazine 206. As illustratively shown in arrangement-A, the tape cartridge magazine 206 is in the process of being moved on to the shelf 220 in the direction of the arrow. The auxiliary memory reader 232 is shown transmitting an RF field 304 via an auxiliary radio frequency memory device 104 contained in cartridge A 302. Arrangement-B illustrates the auxiliary radio frequency memory device 104 contained in tape cartridge A 302 transmitting data, such as SCD information relative the history of loads associated with cartridge A 302, in the form of an RF signal 306 to the auxiliary memory reader 232 when positioned in the presence of the RF field 304. In one embodiment of the present invention, the auxiliary radio frequency memory device 104 is a passive device because it is energized when subjected to a strong enough RF field produced by the auxiliary memory reader 232. Information is transmitted between the auxiliary radio frequency memory device 104 and the auxiliary memory reader 232 via a specific radio frequency, shown here as 304 and 306. Data can be transferred and stored on the auxiliary radio frequency memory device 104 from the library 200 or alternatively (and in addition to) data from the auxiliary radio frequency memory device 104 can be transferred to the auxiliary memory 240 via the auxiliary memory reader 232. Arrangement-C illustrates the auxiliary radio frequency memory device 104 contained in tape cartridge B 308 transmitting data in the form of an RF signal 307 to the auxiliary memory reader 232 when positioned in the presence of the RF field 304. Arrangement-D illustrates the auxiliary radio frequency memory device 104 contained in tape cartridge C 310 transmitting data in the form of an RF signal 309 to the auxiliary memory reader 232 when positioned in the presence of the RF field 304.

Figure 5:
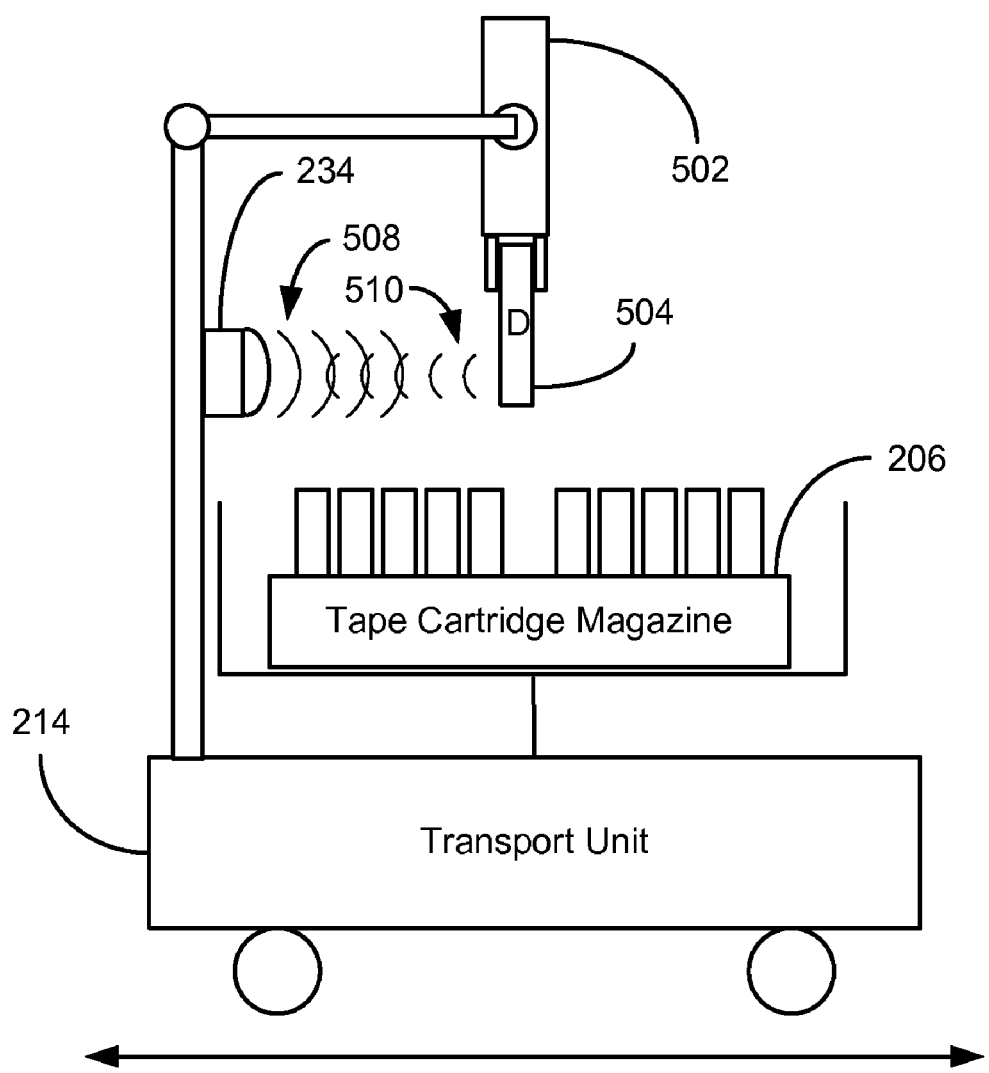
FIG. 5 shows an embodiment of an auxiliary radio frequency memory device reader located at the library entry/exit port location consistent with embodiments of the present invention.

With reference to FIG. 5, shown therein is an illustration of the transport unit 214, of FIG. 2A, in greater detail. The transport unit 214 is adapted to transport tape cartridge magazines 206 within the library 200. A cartridge picker 502, which can be associated with the transport unit 214, is adapted to move cartridges 100 from a tape cartridge magazine 206 into a cooperating read/write relationship with a tape drive, such as tape drive 224 of FIG. 2A. The transport unit 214 is illustratively shown herein accommodating an auxiliary memory reader 234 that is transmitting an RF signal 508 (and potentially data) to an auxiliary radio frequency memory device 104 contained in tape cartridge D 504 whereby the auxiliary radio frequency memory device 104 of cartridge D 504 is transmitting data, such as historical SCD information, via an RF signal 510 to the auxiliary memory reader 234.

Data, including functional drive/cartridge status information, from each tape cartridge's auxiliary radio frequency memory device 104, obtained by an auxiliary radio frequency memory device reader, such as 230, 232, 234, or the like, can be stored on an auxiliary storage device 240 associated with the library 200. Optionally, the data can be stored in memory associated in an alternative location, such as with the host 202, for example. Because many potential attributes can be stored on an auxiliary radio frequency memory device 104, the manner in which the data can be displayed may be organized in accordance with specific needs. For example, each recorded cartridge can have an associated file where upon opening the file, one can choose which attribute to display. Alternatively, a display can include a handful of most frequently viewed data or data filtered according to specific performance related thresholds. Illustrative examples are shown in FIGS. 6A-6C.

With reference to FIG. 6A, shown therein is one example of a displayed data table 600 pertaining to alert action based on functional status information, and more specifically, SCD information. The table 600 can be generated from multiple tape cartridge SCD information that are cumulatively stored on the auxiliary storage device 240 and displayed on the graphical user interface 218, a remote monitor or some other display device that can be viewed by an end user or operator, for example. As previously discussed, the SCD information for each tape cartridge 100 is read from the cartridge's associated auxiliary radio frequency memory device 104 and transmitted via an auxiliary radio frequency memory device reader, such as 230, 232, 234, 236, or some other means for transmitting the SCD information to an end user. The SCD information is sorted by an action 606 to replace a cartridge 100 which, in this example, is an excessive number of load errors. As illustrated, three columns are displayed, namely; the tape cartridge bar code serial number 602, the SCD functional status of time a tape cartridge is loaded in a drive 604 and the action to replace a tape cartridge 606. Here, the number of load errors recorded that exceed four causes an alert action 606. As illustratively shown, bar code serial number AAC has an action to be replaced because of five errors that are identified as an SCD error code "7". Bar code serial number AAF has an action to be replaced because of four errors that are in sequence "4, 5, 4, 4". Bar code serial number BCC has an action to be replaced because of six errors that are identified as an SCD error code "6". A decision to replace the tape cartridge, repair a drive, or replace a drive can be left up to an operator or end user or can optionally be automatically accomplished by the library 200, for example. This is where I left off.

FIG. 6B shows an alternative example of a displayed data table 620 showing all tape cartridges in a library. As illustrated, three columns are displayed, namely; the tape cartridge bar code serial number 610 in order, the corresponding SCD functional status of time a tape cartridge is loaded in a drive 612 and the action to replace a corresponding tape cartridge 614. As in the example of FIG. 6A, the number of load errors recorded that exceed four causes an alert action. As illustratively shown bar code AAA has posted two errors that are identified as an SCD error code "6", hence no action is needed at the current time. Bar code AAB has not errors posted, and as illustratively shown in FIG. 6A, bar code serial number AAC has an action to be replaced because of five errors that are identified as an SCD error code "7". The bar code by serial number column 610 continues as indicated by the " . . . ". FIG. 6C shows an alternative example of a displayed data table 640 showing just tape cartridge AAA and a list of SCD of four tape drives that are used with tape cartridge AAA. All of the tape drives comprise an SCD, such as that provided by an IBM LTO-3 tape drive, though some drives do not but may be able to determine functional status, nonetheless. As illustrated, five columns are displayed, namely; serial number AAA load count arranged in successive loads 642, drive-1 load status 644, drive-2 load status 646, drive-3 load status 648 and drive-4 load status 650. As illustrated for loads 2, 5 and 8, drive-3 is registering error 6 which may be a tape drive or media error displayed by drive-3. As such, an operator or user of data may arrive at the conclusion that drive-3 is broken or may need servicing. The registered SCD of 0 indicates that no error occurred.

Figure 7:
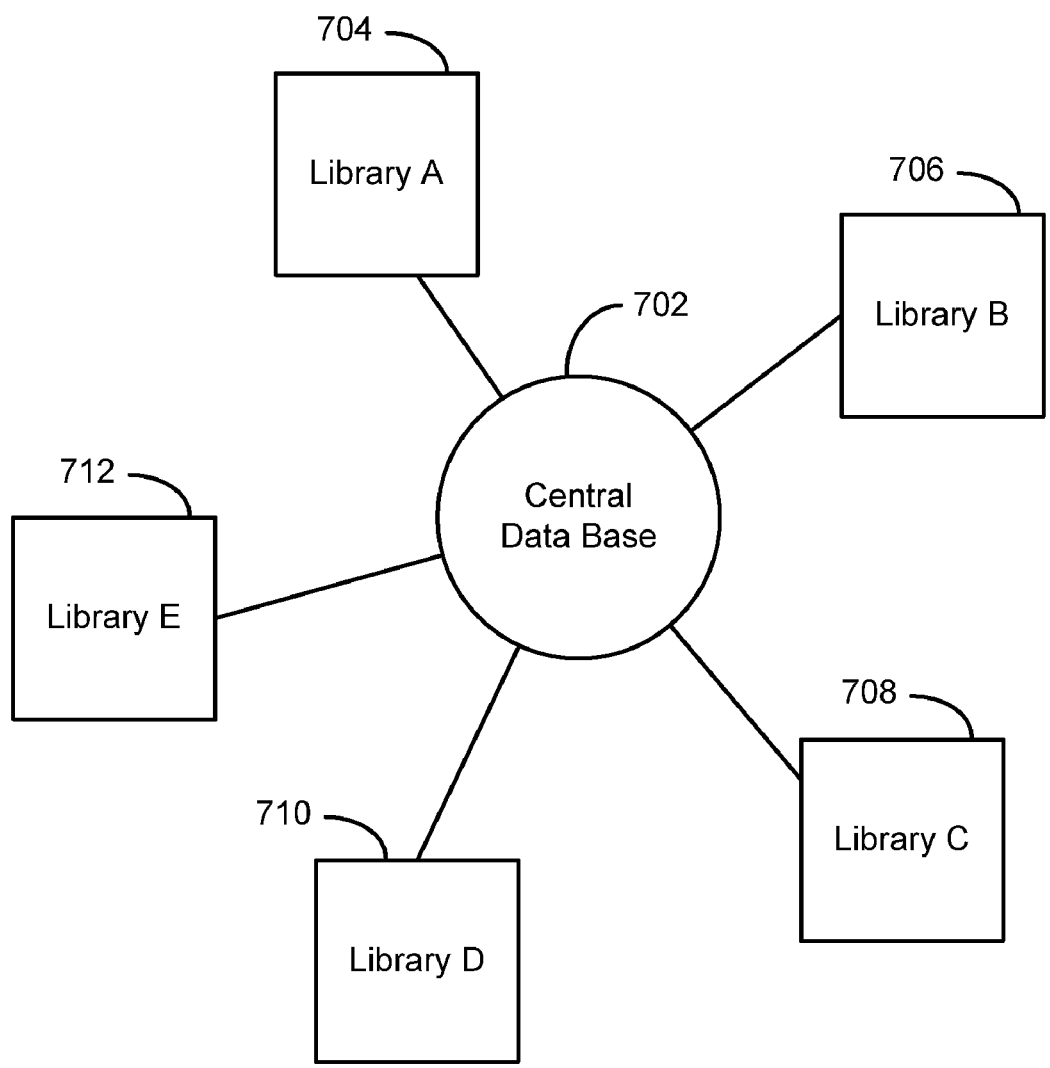
FIG. 7 is a block diagram illustrating a central data base acting as a repository for information pertaining to a plurality of tape cartridges in a plurality of libraries in accordance with an embodiment of the present invention.

FIG. 7 is a block diagram illustrating a central data base 702 acting as a repository for information pertaining to at least each tape cartridge associated with each library. As shown in the illustrative arrangement, library A 704, B 706, C 708, D 710 and E 712 are each linked to the central data base 702. The central data base 702 can provide storage of any, and all, auxiliary radio frequency memory device information contained in each tape cartridge associated with each library A-E 704-712. In one embodiment, all of the tape cartridges comprised by library A 704 may each comprise an auxiliary radio frequency memory device, such as the device 104. The central data base 702 can, therefore, contain all of the information from each of the auxiliary radio frequency memory devices from library A 704 and further be adapted to sort the information in any number of ways including the exemplary arrangements of FIGS. 6A-6C. Library B 706 may comprise tape cartridges that do not have an auxiliary radio frequency memory device, thus, only those that do have an auxiliary radio frequency memory device can store associated information on the central data base 702. Library C 708 may include some cartridges with an attribute associated with each auxiliary radio frequency memory device that bars storing any associated information on the central data base 702, hence, only those cartridges that are allowed to be stored (i.e., not bared) on the central data base 702 are stored. The auxiliary radio frequency memory device information stored on the central data base can be viewed by an authority, such as an Original Equipment Manufacturer of libraries and/or tapes, for purposes of tape management, such as replacing damaged or worn out tapes or notifying a user of data if something out of the ordinary has occurred.

Figure 8:
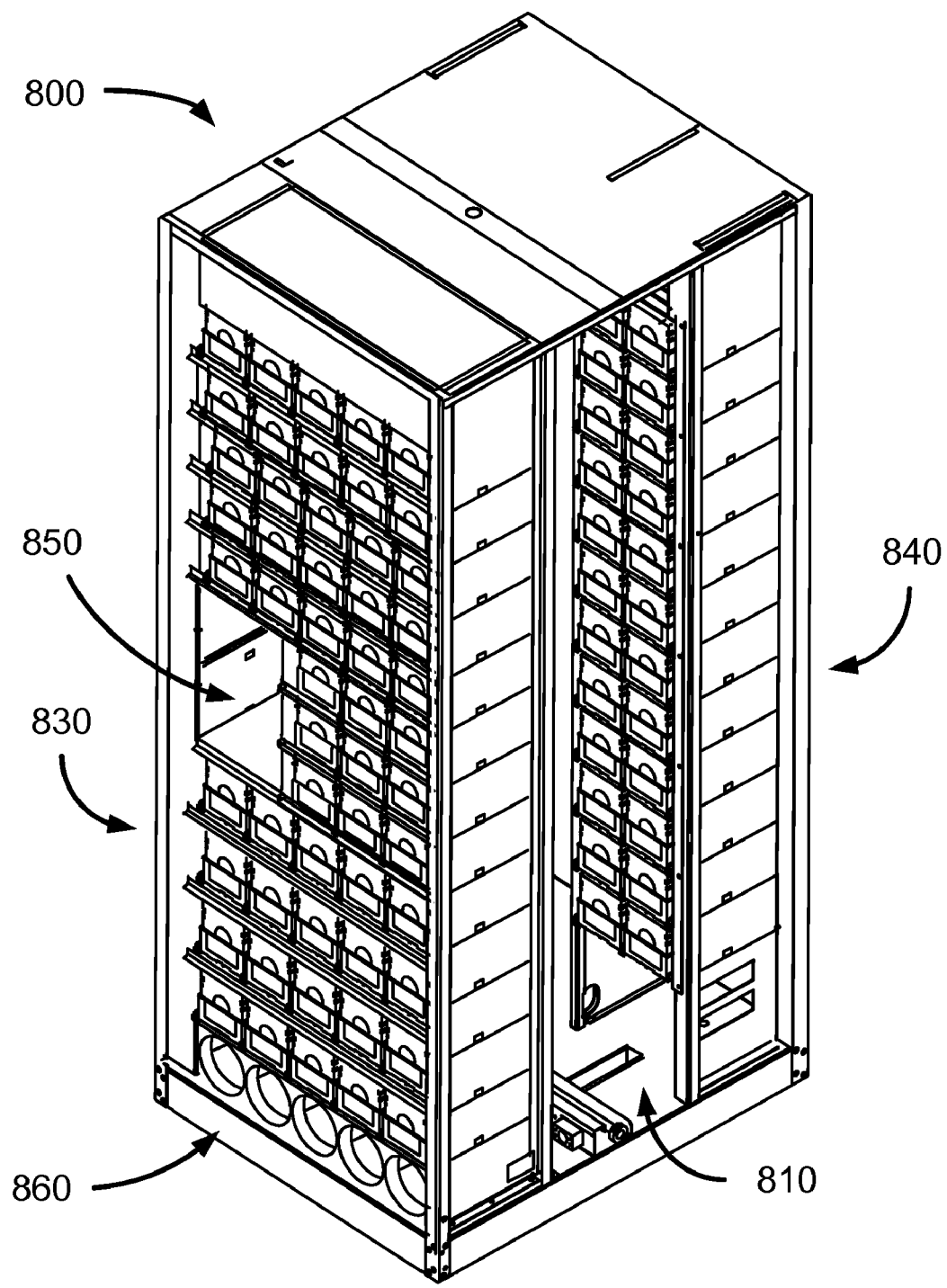
FIG. 8 shows a commercial embodiment of one T-950 library unit wherein aspects of the present invention can be practiced.

Embodiments of the present invention can be commercially practiced in a Spectra Logic T-950 tape cartridge library manufactured by Spectra Logic of Boulder Colo. FIG. 8 shows a commercial embodiment of one T-950 unit 800 without an enclosure. The T-950 library 800 comprises a first and second shelf system 830 and 840 that are adapted to support a plurality of the mobile media, such as the tape cartridge magazine 206 comprising a plurality of LTO-3 tape cartridges with MAMs, archived by the library 800. The shelf systems 830 and 840 can each comprise at least one auxiliary memory reader, such as the auxiliary memory reader 232 of FIG. 2A. Furthermore, the second shelf system 840 comprises at least one four IBM LTO-3 drives that each comprise an SCD (not shown) and are adapted to read and write data to and from a tape cartridge. The IBM LTO-3 drives each have the capability of storing data to an auxiliary radio frequency memory device 104 contained in an LTO-3 cartridge. Functionally interposed between the first and second shelf system 830 and 840 is a magazine transport space 810. The magazine transport space 810 is adapted to provide adequate space for a tape cartridge magazine 206 to be moved, via a magazine transport and cartridge picker (not shown), from a position in the first shelf system 830, for example, to a drive. The magazine transport and picker can further accommodate at least one auxiliary radio frequency memory device reader, such as the reader 234 from FIG. 2A. Tape cartridge magazines 206 can be transferred into and out from the T-950 library 800 via an entry/exit port 850. An auxiliary radio frequency memory device reader, such as the reader 236 from FIG. 2A, can be associated with the entry/exit port 850. Transferring tape cartridge magazines 206 in and out of the T-950 library 800 can be accomplished by an operator for example. The T-950 library 800 comprises a means for cooling as shown by the fans 860, located at the base of the library 800. The T-950 library 800 can be linked to a central data base, such as the data base 702, wherein the central data base can provide storage of all of the auxiliary radio frequency memory devices, such as the device 104, contained in each tape cartridge in the T-950 library 800 as read by any one of the auxiliary radio frequency memory device readers. The T-950 library 800 also provides a graphical user interface (not shown) whereon a display table much like those illustrated in FIGS. 6A-6C can be displayed. In an alternative embodiment, simple messages pertaining action associated with a tape cartridge can be displayed, such as an alert accompanying a sound alarm, for example.

Figure 9:
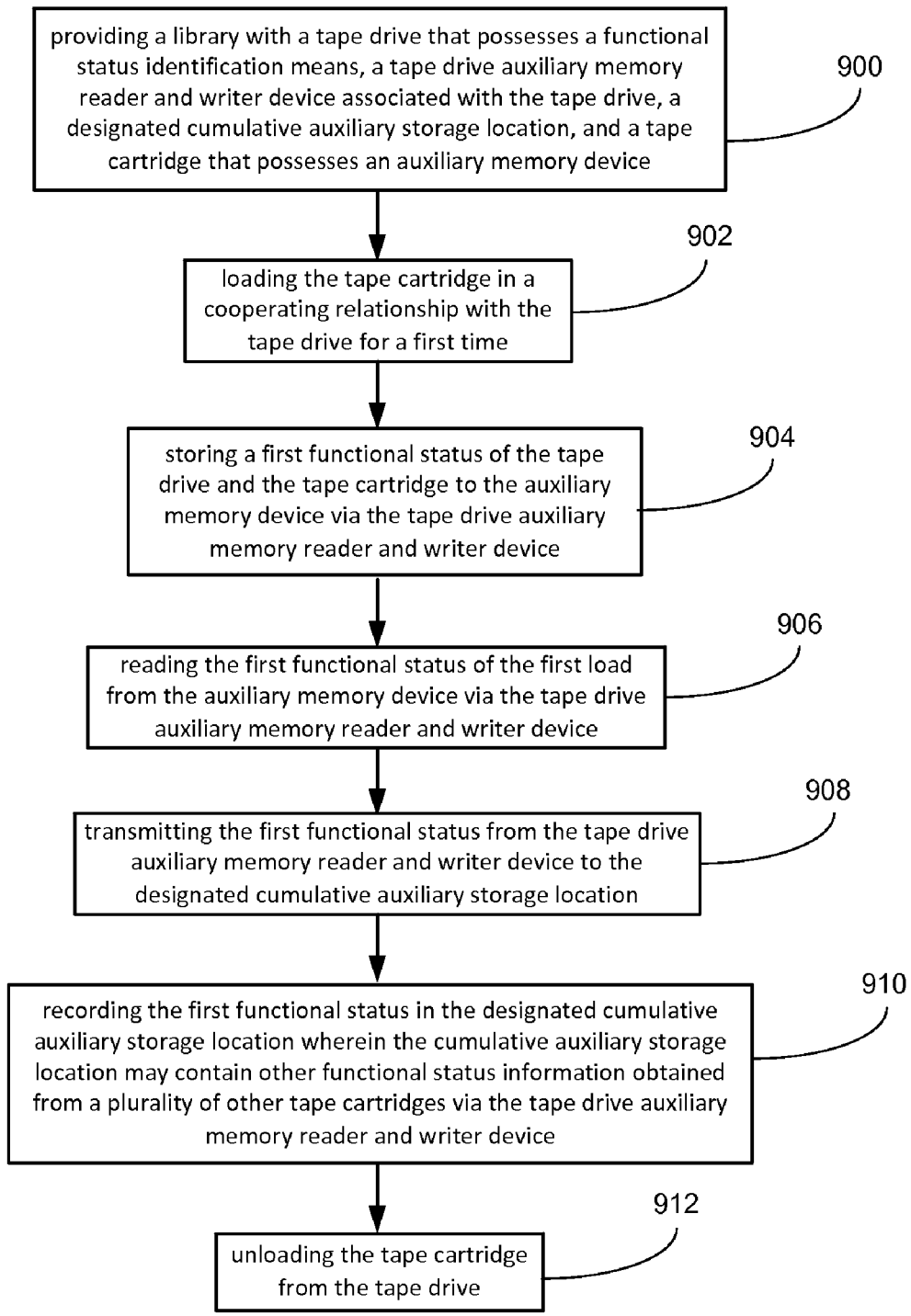
FIG. 9 is a block diagram illustrating a method to practice an embodiment of the present invention.

Referring now to FIG. 9 in conjunction with FIG. 2A, shown therein is a method to practice an embodiment of the present invention. It should be recognized that the steps presented in the described embodiments of the present invention do not necessarily require any particular sequence unless otherwise stated. As shown in step 900, a library 200 is provided with a tape drive 224 that possesses a functional status identification means, a tape drive auxiliary memory reader and writer device 230 associated with the tape drive 224, a designated cumulative auxiliary storage location 240, and a tape cartridge 201 that possesses an auxiliary memory device 104. As shown in step 902, the tape cartridge 201 is loaded in a cooperating relationship with the tape drive 224 for a first time. As shown in step 904, a first functional status of the tape drive 224 and the tape cartridge 201 is stored to the auxiliary memory device 104 via the tape drive auxiliary memory reader and writer device 230. As shown in step 906, the first functional status of the first load is read from the auxiliary memory device 104 via the tape drive auxiliary memory reader and writer device 230. As shown in step 908, the first functional status is transmitted from the tape drive auxiliary memory reader and writer device 230 to the designated cumulative auxiliary storage location 240. Step 908 can be performed after step 906 or after unloading the tape cartridge 201 and re-loading the tape cartridge 201 a later time. As shown in step 910, the first functional status is recorded in the designated cumulative auxiliary storage location 240 wherein the cumulative auxiliary storage location 240 may contain other functional status information obtained from a plurality of other tape cartridges 100 via the tape drive auxiliary memory reader and writer device 230. In an alternative embodiment, other auxiliary memory reader and writer devices, such as 232 and 234 can be used to complete this step. As shown in step 912, the tape cartridge 201 is unloaded from the tape drive 224.

Figure 10:
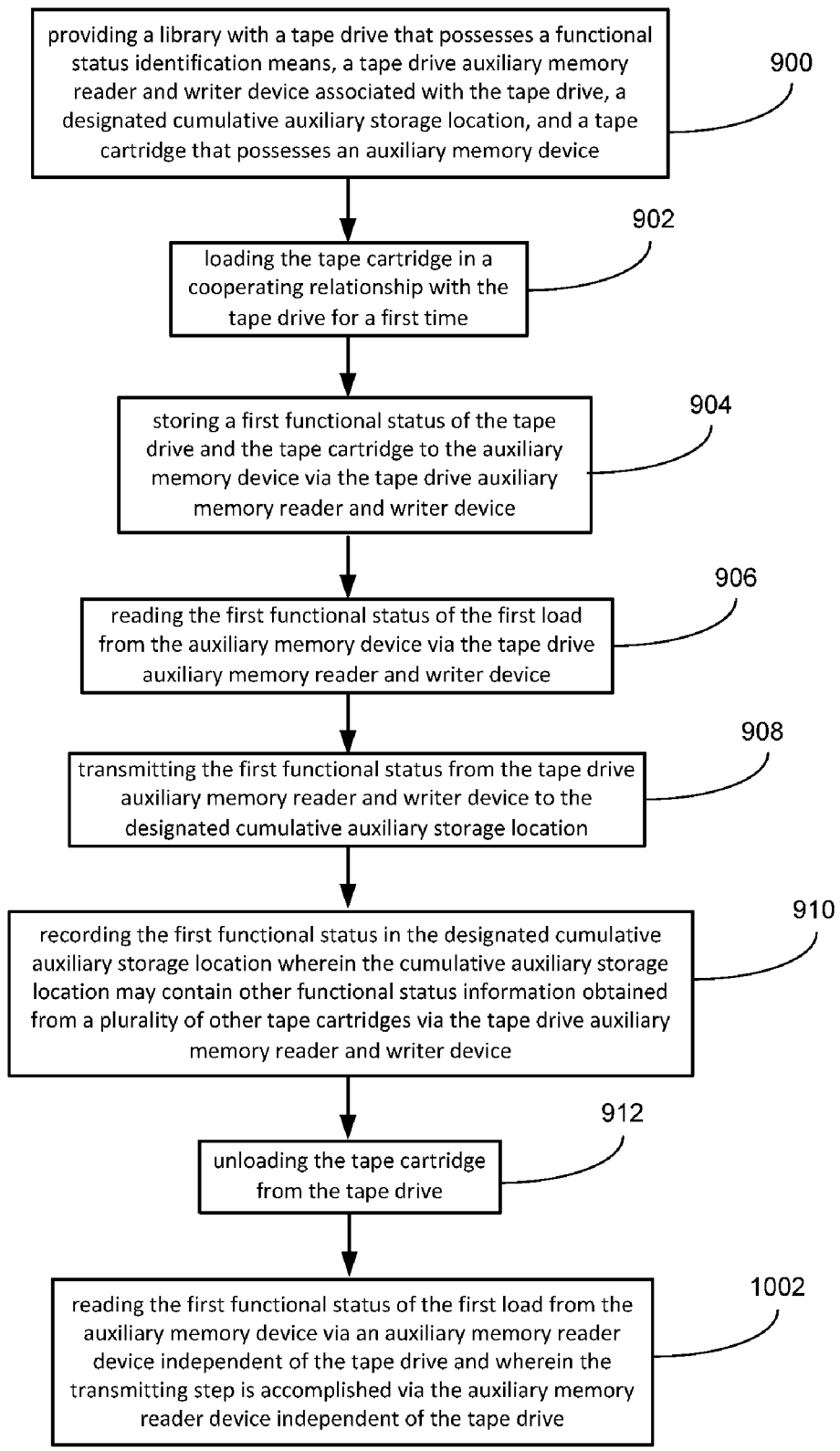
FIG. 10 is a block diagram illustrating an alternative method to practice an embodiment of the present invention.

FIG. 10 shows some alternative embodiments of the present invention which includes method steps 902, 904, 906, 908, 910 and 912 from FIG. 9. For the embodiment in step 1002, the first functional status of the first load is read from the auxiliary memory device 104 via an auxiliary memory reader device independent of the tape drive 224, such as the reader device 232, for example, and wherein the transmitting step 908 is accomplished via the auxiliary memory reader device independent of the tape drive 224. In yet another alternative embodiment, the method of shown in FIG. 9 can include steps to load the tape cartridge 201 in a cooperating relationship with the tape drive 224 for a second time, store a second functional status of the tape drive 224 and the tape cartridge 201 to the auxiliary memory device via the tape drive auxiliary memory reader and writer device 230, read the second functional status of the second load from the via the tape drive auxiliary memory reader and writer device 230, transmit the first and the second functional status from the tape drive auxiliary memory reader and writer device 230 to the designated cumulative auxiliary storage location 240, and record the first and the second functional status in the designated cumulative auxiliary storage location 240. In yet another alternative embodiment, the method of shown in FIG. 9 can include steps to provide a second tape drive 222 that possesses a second functional status identification means 272, a second tape drive auxiliary memory reader and writer device 230 associated with the second tape drive 222, load the tape cartridge 201 in a cooperating relationship with the second tape drive 222, store a second functional status of the tape drive 222 and the tape cartridge 201 to the auxiliary memory device 104 via the tape drive auxiliary memory reader and writer device 230 associated with the second tape drive 222, read the second functional status of the load with the second drive 222 from the auxiliary memory device 104 via the second tape drive auxiliary memory reader and writer device 230, transmit the first and the second functional status from the second tape drive auxiliary memory reader and writer device 230 to the designated cumulative auxiliary storage location 240, and record the first and the second functional status in the designated cumulative auxiliary storage location 240.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple auxiliary memory reader devices independent of a tape drive can be used inside of a library with one or more tape cartridge's associated auxiliary memory device at the same time while still maintaining substantially the same functionality without departing from the scope and spirit of the present invention. Another example can include using tape drives that do not have SCD's but do, however, have the capability of determining at least one functional status when loaded with a tape cartridge and transferring knowledge of the functional status to the tape's auxiliary radio frequency memory device 104 or optionally directly to an auxiliary storage device, such as the device 240, while still maintaining substantially the same functionality without departing from the scope and spirit of the present invention. Another example can include using auxiliary memory reader devices independent of a tape drive to check accuracy of data via redundancy not to mention techniques in which data from multiple tape cartridges, via their associated auxiliary memory devices, can be accumulated coincidentally, just to name a few examples while still maintaining substantially the same functionality without departing from the scope and spirit of the present invention. Further, though elements and methods are described herein exemplifying a first and second object or element, for example, this language is used herein to simplify the description indicative of a plurality of objects or elements. Finally, although the preferred embodiments described herein are directed to tape library systems, RF devices, SCD tape drives and related technology, it will be appreciated by those skilled in the art that the teachings of the present invention can be applied to other remote communication systems and devices, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage library comprising:
a plurality of tape cartridges each possessing an auxiliary radio frequency memory device;
at least one tape drive capable of determining functional status of said tape drive when interacting with said tape cartridge to at least form a cooperating reading and writing relationship, said tape drive possessing an auxiliary reader and writer device adapted to transfer information associated with said functional status to and from said auxiliary radio frequency memory device possessed by said tape cartridge;
said information maintained by said auxiliary radio frequency memory device and wherein said information is transmittable from said auxiliary radio frequency memory device to a display device that can be viewed by an end user, said auxiliary memory reader and writer device capable of transmitting said information as read from said auxiliary radio frequency memory device to said display device viewed by said end user;
an auxiliary storage device capable of receiving and maintaining said information from said auxiliary memory reader and writer device, said auxiliary storage device adapted to contain said information from said plurality of tape cartridges, said data storage library further comprising a computer implemented algorithm that is adapted to statistically analyze any of said information received from said plurality of tape cartridges wherein said statistical analysis is transmitted to said display device.

2. The data storage library of claim 1 further comprising an auxiliary memory reader device independent of said tape drive that is capable of reading said information from one of said auxiliary radio frequency memory devices and transmitting said information to said display device.

3. The data storage library of claim 2 further comprising an auxiliary storage device capable of receiving said information from said auxiliary memory reader device independent of said tape drive for storage.

4. The data storage library of claim 1 wherein said functional status of said tape drive is selected from the group consisting of: no error, cooling problem, power problem, library firmware problem, tape drive firmware problem, tape drive hardware problem, media error, combination tape drive and media error, bus failure, and drive needs to be cleaned.

5. The data storage library of claim 1 wherein said tape drive further comprises a single character display that displays a representation of said functional status.

6. The data storage library of claim 5 wherein said information coincides with said single character display.

7. The data storage library of claim 1 wherein said information is used as an alert to replace either one of said tape cartridges or said at least one tape drive.

8. A data storage library comprising:
a tape cartridge possessing an auxiliary radio frequency memory device;
a tape drive capable of displaying functional status of at least one aspect of interaction between said tape drive and said tape cartridge when at least forming a cooperating relationship on a single character display, said tape drive possessing an auxiliary reader and writer device capable of transferring information associated with said functional status to and from said auxiliary radio frequency memory device wherein said information associated with said functional status is maintained in said auxiliary radio frequency memory device;
said information from said auxiliary radio frequency memory device is transmittable to a display device that can be viewed by an end user, said auxiliary memory reader and writer device is capable of transmitting said single character display information as read from said auxiliary radio frequency memory device to said display device viewed by said end user;
an auxiliary storage device capable of receiving and retaining said single character display information from said auxiliary memory reader and writer device wherein said auxiliary storage device capable of retaining all of said single character display information from all of said tape cartridges, all of said single character display information from all of said tape cartridges are capable of being manipulated via an algorithm to generate at least one statistic related to said single character display information wherein said at least one statistic is transmitted to said display device.

9. The data storage library of claim 8 wherein said single character display information is selected from the group consisting of: no error, cooling problem, power problem, firmware problem, tape drive firmware problem, tape drive hardware problem, media error, combination tape drive and media error, bus failure, and drive needs to be cleaned.

10. A method comprising steps of:
providing a library with a tape drive that possesses a means for identifying functional status, a tape drive auxiliary memory reader and writer device associated with said tape drive, a designated cumulative auxiliary storage location, and a tape cartridge that possesses an auxiliary memory device;
loading said tape cartridge in a cooperating relationship with said tape drive for a first time;
storing a first functional status of said loaded tape drive to said auxiliary memory device via said tape drive auxiliary memory reader and writer device;

reading said first functional status stored in said auxiliary memory device with said tape drive auxiliary memory reader and writer device;

transmitting said first functional status from said tape drive auxiliary memory reader and writer device to said designated cumulative auxiliary storage location;

recording said first functional status in said designated cumulative auxiliary storage location wherein said cumulative auxiliary storage location is capable of recording other functional status information associated with a plurality of other tape cartridges and transmitted thereto via said tape drive auxiliary memory reader and writer device; and unloading said tape cartridge from said tape drive.

11. The method of claim 10 further comprising reading said first functional status of said first load from said auxiliary memory device via an auxiliary memory reader device independent of said tape drive and wherein said transmitting step is accomplished via said auxiliary memory reader device independent of said tape drive.

12. The method of claim 10 further comprising:

loading said tape cartridge in a cooperating relationship with said tape drive for a second time;

storing a second functional status of said tape drive and said tape cartridge to said auxiliary memory device via said tape drive auxiliary memory reader and writer device;

reading said second functional status of said second load from said tape drive auxiliary memory reader and writer device;

transmitting said first and said second functional status from said tape drive auxiliary memory reader and writer device to said designated cumulative auxiliary storage location; and recording said first and said second functional status in said designated cumulative auxiliary storage location.

13. The method of claim 10 further comprising:

providing a second tape drive that possesses a second functional status identification means, a second tape drive auxiliary memory reader and writer device associated with said second tape drive;

loading said tape cartridge in a cooperating relationship with said second tape drive;

storing a second functional status of said tape drive and said tape cartridge to said auxiliary memory device via said tape drive auxiliary memory reader and writer device;

reading said second functional status of said load with said second drive from said auxiliary memory device via said second tape drive auxiliary memory reader and writer device;

transmitting said first and said second functional status from said second tape drive auxiliary memory reader and writer device to said designated cumulative auxiliary storage location; and recording said first and said second functional status in said designated cumulative auxiliary storage location.

* * * * *